Nov. 28, 1961  P. PLURIEN ET AL  3,010,536
POROUS MEMBRANES AND METHODS OF MANUFACTURING
THESE MEMBRANES
Filed May 20, 1957
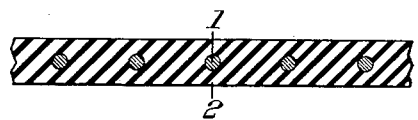

United States Patent Office 3,010,536
Patented Nov. 28, 1961

3,010,536
POROUS MEMBRANES AND METHODS OF MANUFACTURING THESE MEMBRANES
Pierre Plurien, Paris, and Jean Parisot, Argenteuil, France, assignors to Commissariat a l'Energie Atomique, Paris, France, a society of France
Filed May 20, 1957, Ser. No. 660,344
Claims priority, application France May 22, 1956
13 Claims. (Cl. 183—2)

Our invention has for its object the manufacture of porous membranes, intended in particular to be used as diffusion barriers having a high resistance to chemical corrosion.

Membranes according to our invention are essentially constituted by a fabric of a corrosion resisting material (in particular a metallic fabric) embedded in a layer of at least one substance of the group consisting of fluorohydrocarbon polymers (in particular polytetrafluoroethylene), chlorofluorohydrocarbon polymers and halogenated hydrocarbon greases and waxes.

Our method consists essentially in forming an emulsion of at least one body selected from the above stated group, treating said emulsion with a coagulant to transform it by flocculation into a moist paste, coating a corrosion resistant fabric with a layer of said paste, fixing said layer on said fabric and eliminating the coagulant from said layer.

Polytetrafluoroethylene (known commercially under the name Teflon) is preferred to constitute the emulsion according to our invention.

Preferably the polytetrafluoroethylene is in the form of a colloid the particles of which have a diameter at most equal to one micron.

Advantageously, the emulsion also contains a substantial amount of a non ionic wetting substance, for instance an alkylaryl polyether alcohol such as the product known commercially under the name Triton X100, or an alcoholized phenol glycolic ether such as the product known commercially under the name Lissatol.

The coagulant intended to form the paste by flocculation of the polytetrafluoroethylene emulsion may be for instance an alcohol (methyl, ethyl, isopropyl, butyl, isobutyl, isoamyl alcohols), cyclohexanol, acetone or some acid such as acetic acid. This coagulant is added gradually to the polytetrafluoroethylene emulsion, while constantly stirring the whole. We thus obtain a paste which hardens gradually. When it is sufficiently hard to be detached from the wall of the container in which it is placed, it is preferable to extract therefrom, for instance by decantation, some amount of the wetting substance and of the coagulant in excess. However the extraction of coagulant must not be total and the plaste must retain some plasticity which makes it possible to spread it on a support.

A small amount of the still moist paste is spread on a metallic fabric resistant to corrosion (for instance of nickel, silver or a metal plated or coated with nickel or silver) and the paste is fixed in the fabric for instance by passing the whole between the rollers of a rolling machine. The metallic fabric is then embedded uniformly in a layer of paste. The dimension of the pores of the layer is determined by the fixation treatment.

The whole is then dried for instance in the atmosphere so as wholly to eliminate both the wetting substance and the coagulant.

If, at the end of the above described treatment, the distribution of the paste on the metallic fabric is not satisfactory, the membranes may be dipped in the coagulant and subjected to a second fixation treatment. The product is then dried as in the first case.

According to a modification, the last traces of wetting substance and coagulant that may remain in the membranes are eliminated by a thermal treatment which consists in heating the membranes at a temperature averaging 300° C. for several hours, either in the presence of oxygen or not. After cooling, the membranes are dipped in alcohol, so that they cannot stick to one another, then preferably subjected to a further fixation treatment.

According to another modification, the mechanical resistance of the membranes is improved by incorporating to the polytetrafluoroethylene emulsion a filler the amount of which may be as high as 60% by weight of dry product. For this purpose, we advantageously add to the emulsion a very fine powder of a substance which cannot be attacked chemically (for instance nickel, calcium fluoride or titanium dioxide). In this case it is preferable preliminarily to disperse this powder in wafer and to add the dispersion thus obtained to the polytetrafluoroethylene emulsion. The remainder of the process is the same as above described.

The porous membranes according to our invention are particularly well adapted for use as separation barriers for the obtainment of uranium isotopes by gaseous diffusion of uranium hexafluoride. However they may also be used for osmometric measurements, fractionation of high polymers having different molecular weights and generally speaking for ultrafiltration in all kinds of mediums, even corrosive ones.

The metallic fabric used as support gives these membranes a high mechanical resistance, owing to which they can be passed between the rollers of a rolling machine, handled without special precautions and subjected to relatively high pressure differences, in particular during a gaseous diffusion operation.

The only figure of the drawing is a sectional view of a membrane according to our invention. The metal fabric is shown at 1 (only the wires perpendicular to the section plane being visible) and the layer of polytetrafluoroethylene is shown at 2.

Some examples of our invention will now be given.

The qualities of these membranes will be defined by the mean radius of their pores, given in microns, and by their permeability, that is to say the rate of flow per minute, given in gram-molecules, of air passing through one sq. cm. of membrane under the effect of a difference of pressure of one cm. of mercury.

EXAMPLE I

The aqueous emulsion of polytetrafluoroethylene is constituted for 60% by a colloid the particles of which have a diameter close to 0.5 micron and it further contains about 6% of a non ionic wetting substance. Its viscosity ranges from 5 to 15 centipoises at room temperature. We gradually add thereto, while constantly stirring, ethyl alcohol acting as coagulant in the proportion of 40 cubic cm. of coagulant for 50 cubic cm. of emulsion. We thus obtain a paste which can be detached from the container. This paste is partly dried so as to extract therefrom from 30 to 45% of the alcohol it contains. It is important to leave some amount of alcohol so as to maintain some plasticity to the paste. The paste is allowed to remain in alcohol for a time ranging from 2 to 5 days, after which a part of the wetting substance is extracted by means of alcohol in a Soxhlet apparatus.

On a nickel wire fabric having a wire number ranging from 100 to 350, a small amount of the paste still in a moist state is spread. The whole is then passed between the rollers of a rolling machine which are gradually moved toward each other. This operation is repeated several times until the desired thickness, which ranges from 0.15 to 0.35 millimeter, is obtained. The nickel fabric uniformly coated with the polytetrafluoroethylene is then dried in the atmosphere for about two hours.

The membranes thus obtained have pores the radius of which ranges from 0.01 to 0.1 micron approximately and they have a permeability ranging from $30 \times 10^{-7}$ to $300 \times 10^{-7}$ gram-molecules of air, per cm. of mercury of pressure difference, per sq. cm. of membrane and per minute.

The permeability of these membranes was measured by means of dry air at room temperature. We obtained for eight samples the results given in the following Table A.

Table A

| Radius of pores in micron: | Permeability $\times 10^{-7}$ |
|---|---|
| 0.027 | 172 |
| 0.05 | 145 |
| 0.04 | 385 |
| 0.03 | 360 |
| 0.08 | 219 |
| 0.01 | 29 |
| 0.01 | 40 |
| 0.01 | 182 |

Furthermore, we studied the efficiency of gaseous diffusion separation, in the case of a mixture constituted, in equal amounts, by nitrogen and carbon dioxide, by means of a porous membrane according to our invention and obtained as indicated by Example I. This efficiency S of separation was measured for different values of the pressure of the gaseous mixture upstream of the membrane while maintaining no pressure on the other side of the membrane. The efficiency is given by the formula $$\frac{\Delta C}{\Delta C_o}$$

in which $\Delta C$ is the measured variation of the concentration of $CO_2$ in the mixture resulting from its passage through the membrane, and, $\Delta C_o$ is equal to 5.6% i.e. the theoretical variation of the concentration of $CO_2$ in the case of an ideal Knudsen flow.

We obtained, for three different samples of membranes according to our invention, the results given in the following Table B.

Table B

| S | Upstream pressure in cms. of mercury | Membrane characteristics |
|---|---|---|
| 1.09 | 5.1 | |
| 1.08 | 10.9 | |
| 1.05 | 19.9 | Radius of the pores=0.01 micron. |
| 0.98 | 30 | Permeability=$29 \times 10^{-7}$. |
| 0.93 | 44.9 | |
| 0.89 | 60 | |
| 1.10 | 5.5 | |
| 1.15 | 13.3 | |
| 1 | 20.7 | |
| 0.94 | 29 | Radius of the pores=0.01 micron. |
| 0.90 | 34.4 | Permeability=$182 \times 10^{-7}$. |
| 0.85 | 48.4 | |
| 0.79 | 69.8 | |
| 1.12 | 5.2 | |
| 1.09 | 10.1 | |
| 0.91 | 19.8 | |
| 0.95 | 29.9 | Radius of the pores=0.03 micron. |
| 0.94 | 30.2 | Permeability=$230 \times 10^{-7}$. |
| 0.86 | 45.2 | |
| 0.80 | 60 | |

EXAMPLE II

The membranes obtained as indicated in Example I undergo a thermal treatment in order to eliminate the last traces of wetting substance, water and alcohol as may have remained in polytetrafluoroethylene. For this purpose, they are heated for about three hours at a temperature of 280° C. in the presence of oxygen. After cooling, the membranes are dipped in alcohol so as to prevent them from sticking to one another and they are subsequently passed between rollers.

The following Table C gives for four samples made according to this example, the characteristics of the membranes obtained.

Table C

| Radius of pores in micron: | Permeability $\times 10^{-7}$ |
|---|---|
| 0.08 | 56 |
| 0.05 | 43 |
| 0.04 | 64 |
| 0.04 | 61 |

EXAMPLE III

Ten grams of very fine nickel powder are placed in suspension in 30 cubic cms. of water which is stirred. 40 cubic cms. of a 60% emulsion of polytetrafluoroethylene are gradually added. The emulsion is flocculated by slowly adding, while constantly stirring, from 30 to 40 cubic cms. of ethyl alcohol. The remainder of the process is carried out as above stated in either of the above examples.

The filler thus added, which further improves the mechanical resistance of the membranes, does not reduce their porosity.

The following Table D gives, for eight samples made with different kinds of fillers, the characteristics of the membranes obtained.

Table D

| Filler | Radius of pores in micron | Permeability $\times 10^{-7}$ |
|---|---|---|
| Nickel | 0.01 | 58 |
| | 0.03 | 69 |
| Colloidal graphite | 0.03 | 111 |
| | 0.04 | 130 |
| Calcium fluoride | 0.03 | 112 |
| | 0.05 | 171 |
| Titanium bioxide | 0.05 | 332 |
| | 0.07 | 265 |

In a general manner, while we have, in the above description, given what we deem to be preferred embodiments of our invention, we do not wish to be limited thereto as there might be changes made therein without departing from the principle of our invention. For instance, we might use polytrifluoromonochloroethylene instead of polytetrafluoroethylene.

What we claim is:

1. A corrosion resistant membrane suitable as diffusion barrier in gaseous isotope separation, said membrane having a permeability of about $30 \cdot 10^{-7}$ to $300 \cdot 10^{-7}$ moles of air per cm. of mercury pressure difference per sq. cm. per minute and comprising a corrosion-resistant metal fabric embedded in a coherent porous mass of polytetrafluoroethylene having as pores solely micropores of a radius of about 0.01 to 0.1 micron.

2. A membrane according to claim 1 in which said metal is selected from the group consisting of nickel and silver.

3. A membrane according to claim 1 in which said metal is coated with another metal selected from the group consisting of nickel and silver.

4. A membrane according to claim 1 in which said polytetrafluoroethylene is mixed with a corrosion resisting filler.

5. A membrane according to claim 1 in which said filler is selected from the group consisting of nickel, calcium fluoride and titanium dioxide.

6. The method of making a porous membrane which comprises forming an emulsion of polytetrafluoroethylene, treating said emulsion with a coagulant to transform it by flocculation into a moist paste, coating a corrosion resistant metallic fabric with a layer of said paste, fixing said layer on said fabric so as to fill the meshes thereof, and eliminating the coagulant from said layer at a temperature below the fusion temperature of the polytetrafluoroethylene.

7. A method according to claim 6 in which a powder of a corrosion resisting material selected from the group consisting of nickel, calcium fluoride and titanium dioxide is added to said emulsion.

8. A method according to claim 6 in which said coagulant is selected from the group consisting of methyl, ethyl, isopropyl, butyl, isobutyl and isoamyl alcohols, cyclohexanol, acetone and acetic acid.

9. A method according to claim 6 in which a non ionic wetting agent is added to the emulsion and the coagulant.

10. The method of making a porous membrane which comprises forming an emulsion of polytetrafluoroethylene, treating said emulsion with a coagulant to transform it by flocculation into a moist paste, coating a corrosion resistant metallic fabric with a layer of said paste, passing the metallic fabric embedded in said layer between the rollers of a rolling machine to fix said layer on said fabric and to fill the meshes thereof and drying the whole in air to eliminate the coagulant from said layer, all these operations being performed at temperatures below the fusion temperature of polytetrafluoroethylene.

11. A method according to claim 10 further comprising, after the operations mentioned in this claim, the steps of placing the membrane once more in the presence of the coagulant, passing it through a rolling machine and eliminating the coagulant.

12. A method according to claim 10 which further comprises, after the operations mentioned in this claim, heating the membrane at a temperature averaging 300° C. for several hours to eliminate the last traces of coagulant therefrom.

13. A method according to claim 12 which further comprises, after the heating treatment, washing the membrane with alcohol and passing it once more through a rolling machine.

References Cited in the file of this patent

UNITED STATES PATENTS

| | | |
|---|---|---|
| 2,686,767 | Green | Aug. 17, 1954 |
| 2,710,266 | Hochberg | June 7, 1955 |
| 2,764,506 | Piccard | Sept. 25, 1956 |
| 2,777,783 | Welch | Jan. 15, 1957 |
| 2,813,041 | Mitchell et al. | Nov. 12, 1957 |

FOREIGN PATENTS

| | | |
|---|---|---|
| 1,112,137 | France | Nov. 9, 1955 |